(12) United States Patent
Kim

(10) Patent No.: US 9,469,343 B2
(45) Date of Patent: Oct. 18, 2016

(54) SYSTEM, METHOD, AND COMPUTER-READABLE RECORDING MEDIUM FOR LANE KEEPING CONTROL

(71) Applicant: MANDO CORPORATION, Pyeongtaek-si, Gyeonggi-do (KR)

(72) Inventor: Soon Tae Kim, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 223 days.

(21) Appl. No.: 14/168,577

(22) Filed: Jan. 30, 2014

(65) Prior Publication Data
US 2014/0218508 A1 Aug. 7, 2014

(30) Foreign Application Priority Data

Feb. 7, 2013 (KR) .......................... 10-2013-0013973

(51) Int. Cl.
G06K 9/00 (2006.01)
B62D 15/02 (2006.01)
G05D 1/02 (2006.01)

(52) U.S. Cl.
CPC ........... *B62D 15/025* (2013.01); *G05D 1/0246* (2013.01); *G06K 9/00798* (2013.01)

(58) Field of Classification Search
CPC .. B62D 15/025; G05D 1/0246; G06F 19/18; G06F 19/20; G06F 19/28; G06K 9/00798
USPC ........................................................ 348/118
See application file for complete search history.

(56) References Cited

U.S. PATENT DOCUMENTS

| | | | | |
|---|---|---|---|---|
| 6,005,492 A | * | 12/1999 | Tamura ................... | B60Q 9/008 180/169 |
| 6,659,570 B2 | * | 12/2003 | Nakamura .......... | B60T 8/17552 180/197 |
| 7,124,027 B1 | * | 10/2006 | Ernst, Jr. ............... | B60W 30/09 340/435 |
| 7,400,963 B2 | * | 7/2008 | Lee .................... | B60K 31/0066 180/171 |
| 9,045,145 B2 | * | 6/2015 | Filev ....................... | B62D 6/007 |
| 2002/0032512 A1 | * | 3/2002 | Shimada .................. | B60K 6/48 701/89 |
| 2003/0079933 A1 | * | 5/2003 | Chabaan ....................... | 180/446 |
| 2004/0102887 A1 | * | 5/2004 | Lin .......................... | B62D 6/04 701/70 |
| 2004/0262063 A1 | * | 12/2004 | Kaufmann et al. .......... | 180/169 |

(Continued)

FOREIGN PATENT DOCUMENTS

KR 10-0766596 B1 10/2007

*Primary Examiner* — Shan Elahi
(74) *Attorney, Agent, or Firm* — Hauptman Ham, LLP

(57) ABSTRACT

A lane keeping control system includes: a lane parameter generation unit configured to generate a relative position between a lane and a vehicle as a lane parameter based on information received from a camera installed on the vehicle; a vehicle state information reception unit configured to receive vehicle state information sensed or measured by each vehicle sensor or device installed on the vehicle; an equivalent model generation unit configured to receive the lane parameter from the lane parameter generation unit, receive the vehicle state information from the vehicle state information reception unit, analyze a time flow-related correlation between the vehicle parameter and the vehicle state information, and generate an equivalent model of each; an erroneous detection determination unit configured to determine and classify a situation of erroneous detection of a lane parameter by simultaneously analyzing a case.

20 Claims, 14 Drawing Sheets

(56) References Cited

U.S. PATENT DOCUMENTS

| | | | |
|---|---|---|---|
| 2005/0027402 A1* | 2/2005 | Koibuchi | B60W 50/00 701/1 |
| 2005/0096827 A1* | 5/2005 | Sadano | B60T 7/22 701/70 |
| 2005/0225477 A1* | 10/2005 | Cong | B60K 31/0008 342/70 |
| 2005/0270145 A1* | 12/2005 | Kataoka et al. | 340/435 |
| 2005/0273218 A1* | 12/2005 | Breed et al. | 701/2 |
| 2005/0273260 A1* | 12/2005 | Nishida | B60Q 1/34 701/301 |
| 2005/0278096 A1* | 12/2005 | Iwazaki | B62D 1/28 701/41 |
| 2006/0142922 A1* | 6/2006 | Ozaki et al. | 701/70 |
| 2007/0055431 A1* | 3/2007 | Deng | B60T 8/1755 701/71 |
| 2007/0198162 A1* | 8/2007 | Kubota | B60K 31/0008 701/96 |
| 2007/0233343 A1* | 10/2007 | Saito | B62D 1/28 701/41 |
| 2007/0288152 A1* | 12/2007 | Lu | B60G 17/018 701/70 |
| 2008/0027607 A1* | 1/2008 | Ertl | B60W 30/16 701/36 |
| 2008/0040039 A1* | 2/2008 | Takagi | 701/300 |
| 2008/0167821 A1* | 7/2008 | Breed | 701/301 |
| 2009/0048738 A1* | 2/2009 | Iwazaki et al. | 701/44 |
| 2009/0157365 A1* | 6/2009 | Higuchi et al. | 703/8 |
| 2010/0145575 A1* | 6/2010 | Switkes et al. | 701/41 |
| 2010/0168998 A1* | 7/2010 | Matsunaga | 701/200 |
| 2010/0209884 A1* | 8/2010 | Lin | G09B 19/167 434/65 |
| 2010/0209891 A1* | 8/2010 | Lin | G09B 19/167 434/66 |
| 2011/0102166 A1* | 5/2011 | Filev | B60W 30/02 340/435 |
| 2014/0236385 A1* | 8/2014 | Filev | B60W 50/08 701/1 |

* cited by examiner

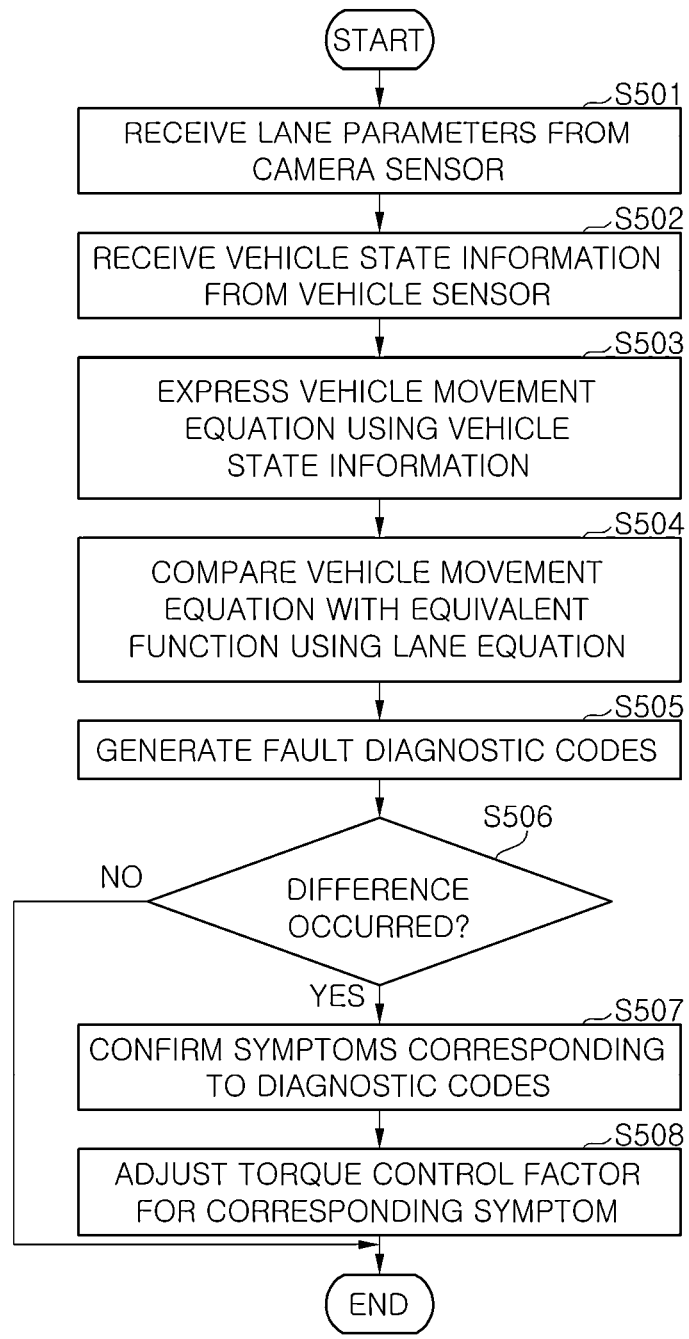

Fig. 6

| ERROR | SIGNA | FORMULA | DESCRIPTION |
|---|---|---|---|
| R1 | LEFT LANE POSITION | $\|y_L - \hat{y}_L\|$ | DIFFERENCE BETWEEN LEFT RAW LANE POSITION VALUE AND LANE POSITION ESTIMATED BY AVEREAGE LANE WIDTH |
| R2 | RIGHT LANE POSITION | $\|y_R - \hat{y}_R\|$ | DIFFERENCE BETWEEN RIGHT RAW LANE POSITION AND LANE POSITION ESTIMATED BY AVERAGE LANE WIDTH |
| R3 | LEFT LANE HEADING ANGLE | $\left\|\phi_L - \frac{1}{v}\left(\frac{dy_L}{dt}\right)\right\|$ | DIFFERENCE BEWEEN LEFT LANE HEADING ANGLE ESTIMATED BY CAMERA AND LEFT LANE HEADING ANGLE ESTIMATD BY VEHICLE SENSOR |
| R4 | RIGHT LANE HEADING ANGLE | $\left\|\phi_R - \frac{1}{v}\left(\frac{dy_R}{dt}\right)\right\|$ | DIFFERENCE BETWEEN RIGHT LANE HEADING ANGLE ESTIMATED BY CAMERA AND RIGHT LANE HEADING ANGLE ESTIMATED BY VEHICLE SENSOR |
| R5 | BOTH LANE HEADING ANGLE | $\|\phi_L - \phi_R\|$ | DIFFERENCE BETWEEN LEFT/RIGHT LANE HEADING ANGLES |
| R6 | LEFT LANE CURVATURE | $\left\|\rho_L - \frac{1}{v}\left(\psi + \frac{d\phi_L}{dt}\right)\right\|$ | DIFFERENCE BETWEEN LEFT LANE CURVATURE ESTIMATED BY CAMERA AND LEFT LANE CURVATURE ESTIMATED BY VEHICLE SENSOR |
| R7 | RIGHT LANE CURVATURE | $\left\|\rho_R - \frac{1}{v}\left(\psi + \frac{d\phi_R}{dt}\right)\right\|$ | DIFFERENCE BETWEEN RIGHT LANE CURVATURE ESTIMATED BY CAMERA AND RIGHT LANE CURVVATURE ESTIMATED BY VEHICLE SENSOR |
| R8 | BOTH LANE CURVATURE | $\|\rho_L - \rho_R\|$ | DIFFERENCE BETWEEN LEFT/RIGHT LANE CURVATURES |

TIME (SECOND)

TIME (SECOND)

TIME (SECOND)

Fig. 11

| FAULT DIAGNOSTIC CODE | | | | | | | | SYMPTOM |
|---|---|---|---|---|---|---|---|---|
| R8 | R7 | R6 | R5 | R4 | R3 | R2 | R1 | |
| L | L | L | L | L | L | L | L | No Fault |
| L | L | L | L | L | L | L | H | DIFFERENCE BETWEEN LEFT LANE POSITION AND LANE POSITION PREDICTED BY AVERAGE LANE WIDTH OCCURRED |
| | | | ... | | | | | ... |
| H | L | H | H | L | H | L | L | LEFT LANE HEADING ANGLE AND CURVATURE INFORMATION IS ABNORMAL |
| H | H | L | H | H | L | L | L | RIGHT LANE HEADING ANGLE AND CURVATURE INFORMATION IS ABNORMAL |
| L | H | H | L | H | H | L | L | LEFT/RIGHT HEADING ANGLE AND CURVATURE INFORMATION IS ABNORMAL |
| L | H | H | H | H | H | L | L | |
| L | H | H | H | H | H | L | L | |
| H | H | H | H | H | H | L | L | |
| | | | | | | | | ... |

FIG. 13

SYSTEM, METHOD, AND COMPUTER-READABLE RECORDING MEDIUM FOR LANE KEEPING CONTROL

CROSS-REFERENCE(S) TO RELATED APPLICATION

This application claims the benefit of Korean Patent Application No. 10-2013-0013973, filed on Feb. 7, 2013, in the Korean Intellectual Property Office, the contents of which are incorporated herein by reference in its entirety.

BACKGROUND OF THE INVENTION

1. Field of the Invention

The present invention relates to an apparatus and a method for detecting lane data faults, and more particularly, to a system, a method, and a computer-readable recording medium for lane keeping control, which use the active control of Electronic Power Steering (EPS) to control estimation of a path targeted by a vehicle.

2. Description of the Related Art

In general, vehicle-related technologies have been variously developed to provide systems that make vehicles safe and comfortable, and such systems have been applied to actual vehicles to improve driver's safety.

There has been extensive research on a lane keeping assist device, as a kind of the above-mentioned safety system, which can prevent accidents resulting from lane departure, which can occur when the driver neglects forward gazing due to driving for a long time, dozing off, or using a cell phone.

Such a lane keeping assist device measures the position of the vehicle and lanes during driving and, when a determination is made that the vehicle will depart from the current lane, applies torque or vibration to the steering wheel using a motor, for example, so that the driver is prompted to return to the lane through steering operation.

Auxiliary torque, which is for the purpose of preventing departure from the current lane, is calculated based on the current situation, and only a part of amount necessary for actual steering is applied to the steering wheel. There is no standardized method for applying torque to the steering wheel; in nations of advanced automobile standards, devices have been in practical use which attach a motor to the steering column and apply auxiliary torque through a clutch mechanism.

The prior art in this regard is as follows: in many cases, a DC motor, a gear, and a clutch mechanism are used to connect with the steering column, or EPS is controlled to apply auxiliary toque.

The performance of such a conventional lane keeping or following device depends on the accuracy of road lane information acquired from the front camera, but the lane recognition performance of the camera may be degraded by various conditions, such as road environments and climate changes.

Therefore, erroneous lane information causes erroneous lane keeping control, making the safety device lose its function and even cause accidents, and such a possibility of accidents is slowing down the widespread use of lane keeping devices.

CITATION LIST

Patent Literature (Patent Literature 1) Korean Patent Registration No. 10-0766596 (Vehicle Steering Control Method For Lane Keeping), Han Min-hong, 2007, Oct. 5

SUMMARY OF THE INVENTION

An aspect of the present invention is directed to a system, a method, and a computer-readable recording medium for lane keeping control, which determine whether lane data, which has been acquired for vehicle control, is normal, thereby preventing the danger of erroneous vehicle control that could occur when abnormal lane data is acquired.

Another aspect of the present invention is directed to a system, a method, and a computer-readable recording medium for lane keeping control, which analyze a time flow-related correlation between lane parameters acquired from cameras and vehicle state information measured from vehicle sensors, obtain equivalent models of each of them, and determine erroneous recognition based on occurrence of a difference for each item, thereby preventing the danger of erroneous control resulting from erroneous lane data.

According to an aspect of the present invention, a lane keeping control system includes: a lane parameter generation unit configured to generate a relative position between a lane and a vehicle as a lane parameter based on information received from a camera installed on the vehicle; a vehicle state information reception unit configured to receive vehicle state information sensed or measured by each vehicle sensor or device installed on the vehicle; an equivalent model generation unit configured to receive the lane parameter from the lane parameter generation unit, receive the vehicle state information from the vehicle state information reception unit, analyze a time flow-related correlation between the vehicle parameter and the vehicle state information, and generate an equivalent model of each; an erroneous detection determination unit configured to determine and classify a situation of erroneous detection of a lane parameter by simultaneously analyzing a case, in which a difference occurs from the equivalent model generated by the equivalent model generation unit, for each of at least one error item; and a torque control factor adjustment unit configured to adjust a torque control factor according to a preset torque control factor adjustment setup so as to suppress or reduce the influence of erroneous torque when it is determined by the erroneous detection determination unit that erroneous detection of a lane parameter has occurred.

The lane parameter generation unit may be configured to generate, as lane parameters, coefficients of a third-order equation expressing a relative position between the lane and the vehicle on a two-dimensional plane.

The vehicle state information received by the vehicle state information reception unit may be at least one selected from vehicle longitudinal velocity, vehicle longitudinal acceleration, vehicle yaw rate, steering angle, steering toque, and vehicle transverse acceleration.

The equivalent model generation unit may be configured to generate an equivalent model by calculating the time flow-related correlation between the vehicle parameter and the vehicle state information as an equivalent function from the received lane parameter and the vehicle state information.

The erroneous detection determination unit may be configured to determine that a situation of erroneous detection has occurred when a difference value in the equivalent model generated by the equivalent model generation unit exceeds a preset threshold.

The erroneous detection determination unit may be configured to determine that a situation of erroneous detection has occurred when a difference value in the equivalent model generated by the equivalent model generation unit exceeds a preset threshold for a preset period of time or longer.

The error item may be at least one selected from a left lane position, a right lane position, a left lane heading angle, a right lane heading angle, a both lane heading angle, a left lane curvature, a right lane curvature, and a both lane curvature.

The preset torque control factor adjustment setup by the torque control factor adjustment unit may be at least one selected from replacement of at least one torque control factor with a different signal, isolation of at least one torque control factor, and adjustment of at least one torque control factor.

According to an aspect of the present invention, a vehicle control system includes: a vehicle camera installed on a vehicle and configured to collect lane data; at least one vehicle sensor installed on the vehicle and configured to sense at least one piece of vehicle state information; a fault detection device configured to generate a lane parameter from lane data collected from the vehicle camera, receive the vehicle state information from the vehicle sensor, analyze a time flow-related correlation between the vehicle parameter and the vehicle state information, generate an equivalent model of each, and determine whether erroneous detection of the lane data has occurred; and an electronic power steering (EPS) configured to receive a steering torque signal from the fault detection device according to a situation of erroneous detection of a lane parameter for each error item of the fault detection device, reflect the steering torque signal on assist torque regarding a driver, and thereby control a steering device.

The fault detection device may include: a lane parameter generation unit configured to generate a relative position between a lane and a vehicle as a lane parameter based on information received from a camera installed on the vehicle; a vehicle state information reception unit configured to receive vehicle state information sensed or measured by each vehicle sensor or device installed on the vehicle; an equivalent model generation unit configured to receive the lane parameter from the lane parameter generation unit, receive the vehicle state information from the vehicle state information reception unit, analyze a time flow-related correlation between the vehicle parameter and the vehicle state information, and generate an equivalent model of each; an erroneous detection determination unit configured to determine and classify a situation of erroneous detection of a lane parameter by simultaneously analyzing a case, in which a difference occurs from the equivalent model generated by the equivalent model generation unit, for each of at least one error item; and a torque control factor adjustment unit configured to adjust a torque control factor according to a preset torque control factor adjustment setup so as to suppress or reduce the influence of erroneous torque when it is determined by the erroneous detection determination unit that erroneous detection of a lane parameter has occurred.

According to another aspect of the present invention, a method for lane data fault detection for lane keeping assist includes: generating a relative position between a lane and a vehicle as a lane parameter based on information received from a camera installed on the vehicle; receiving vehicle state information sensed or measured by each vehicle sensor or device installed on the vehicle; analyzing a time flow-related correlation between the received vehicle parameter and the vehicle state information and generating an equivalent model of each; determining and classifying a situation of erroneous detection of a lane parameter by simultaneously analyzing a case, in which a difference occurs in the generated equivalent model for each of at least one error item; and adjusting a torque control factor according to a preset torque control factor adjustment setup so as to suppress or reduce the influence of erroneous torque when it is determined as a result of the determining that erroneous detection of a lane parameter has occurred.

In the generating a relative position, coefficients of a third-order equation expressing a relative position between a lane and a vehicle on a two-dimensional plane may be generated as lane parameters.

The received vehicle state information may be at least one selected from vehicle longitudinal velocity, vehicle longitudinal acceleration, vehicle yaw rate, steering angle, steering toque, and vehicle transverse acceleration.

In the analyzing, an equivalent model may be generated by calculating a time flow-related correlation between the vehicle parameter and the vehicle state information as an equivalent function from the received lane parameter and the vehicle state information.

In the determining and classifying, it may be determined that a situation of erroneous detection has occurred when a difference value in the generated equivalent model exceeds a preset threshold.

In the determining and classifying, it may be determined that a situation of erroneous detection has occurred when a difference value in the generated equivalent model exceeds a preset threshold for a preset period of time or longer.

The error item may be at least one selected from a left lane position, a right lane position, a left lane heading angle, a right lane heading angle, a both lane heading angle, a left lane curvature, a right lane curvature, and a both lane curvature.

The preset torque control factor adjustment setup may be at least one selected from replacement of at least one torque control factor with a different signal, isolation of at least one torque control factor, and adjustment of at least one torque control factor.

According to another aspect of the present invention, a vehicle control method for lane keeping assist includes: collecting lane data from a vehicle camera installed on a vehicle; sensing at least one piece of vehicle state information from at least one vehicle sensor installed on the vehicle; generating a lane parameter from the lane data collected from the vehicle camera; receiving the vehicle state information from the vehicle sensor, analyzing a time flow-related correlation between the vehicle parameter and the vehicle state information, and generating an equivalent model of each; determining whether erroneous detection of the lane data has occurred based on the generated equivalent model; and generating a steering torque signal according to a situation of erroneous detection of a lane parameter for each error item based on the determining whether erroneous detection of the lane data has occurred and providing an EPS with the generated steering torque signal.

The method for lane data fault detection for lane keeping assist and the information for receiving the vehicle control method may be stored in a recording medium that can be readable by a server computer. The recording medium is any type of recording medium that can store programs and data which can be thereafter read by a computer system.

Examples of the recording medium may include read-only memory (ROM), random-access memory (RAM), compact disk (CD), digital video disk (DVD)-ROM, magnetic tapes, floppy disks, optical data storage devices, and carrier waves (such as data transmission through the Internet). In addition, the recording medium can also be distributed over network-coupled computer systems so that codes are stored and executed in a distributed fashion.

BRIEF DESCRIPTION OF THE DRAWINGS

FIG. 5 is a flowchart illustrating a fault detection procedure according to an embodiment of the present invention.

FIG. 6 is a diagram illustrating differences of respective parameters according to an embodiment of the present invention.

FIG. 11 is a diagram illustrating symptoms for respective fault diagnostic codes according to an embodiment of the present invention.

FIG. 13 is a diagram illustrating measures for respective fault diagnostic codes according to an embodiment of the present invention.

DETAILED DESCRIPTION OF EXEMPLARY EMBODIMENTS

The present invention discloses a device and a method for lane data fault detection for lane keeping assist, which use the active control of Electronic Power Steering (EPS) to prevent the danger of erroneous vehicle control by detecting lane data faults in a lane keeping control system for controlling the estimation of a path targeted by a vehicle.

Therefore, the present invention analyzes a time flow-related correlation between lane parameters acquired from cameras and vehicle state information measured from vehicle sensors, obtains equivalent models of each, and determines whether the lane data is recognized erroneously based on difference occurrence for each item.

Specifically, the present invention analyzes a time flow-related correlation between lane parameters acquired from camera sensors and vehicle state information measured from vehicle sensors and obtains an equivalent model of each. The present invention analyzes a case, in which there occurs a difference of the equivalent model, simultaneously with regard to a plurality of fault items and thereby determines and classifies lane parameter erroneous detection situations. Accordingly, a control factor is replaced with another signal, isolated, or adjusted so as to suppress or reduce the influence of erroneous torque when calculating torque with respect to a detected lane parameter and erroneous recognition occurrence. Meanwhile, such an erroneous detection determination method can be applied to every system callable of causing a danger when a sensor's erroneous recognition occurs.

Hereinafter, exemplary embodiments of the present invention will be described in detail with reference to the accompanying drawings so that those skilled in the art, to which the present invention pertains, can easily practice the present invention.

Figure 1:
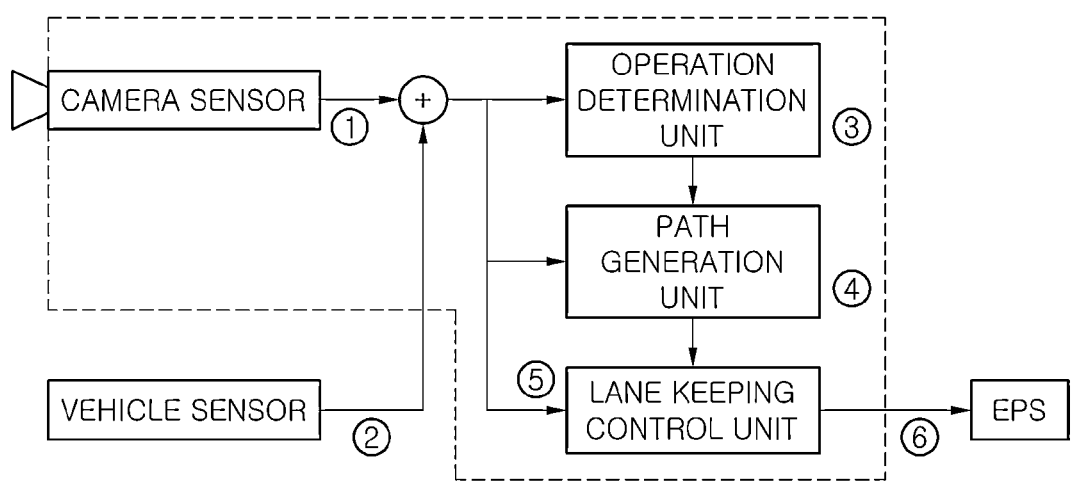
FIG. 1 is a diagram illustrating a lane keeping control system applied to the present invention.

FIG. 1 is a diagram illustrating a lane keeping control system applied to the present invention. Referring to FIG. 1, the lane keeping control system applied to the present invention may include a camera sensor, a vehicle sensor, an operation determination unit, a path generation unit, a lane keeping control unit, and an EPS.

The lane keeping control system is configured to sense the lane using the camera sensor mounted at the front of the vehicle, plan a traveling path within the lane, and perform control so as to follow the target path by using the active control of the EPS, thereby providing the driver with comfort.

When the lane keeping control system senses unintended lane departure, the lane keeping control unit performs lane keeping control using the active control of the EPS, so as to assist the driver's driving.

More specifically, lanes are classified and extracted from images, which have been periodically captured by the camera, and the lanes are approximated as a curve of a third-order equation on plane coordinates and expressed as relative positions with respect to the vehicle.

Therefore, the camera outputs coefficients of the third-order equation, which expresses the relative position with respect to the vehicle on a two-dimensional plane, and respective coefficients output for respective left/right lanes can be expressed as a third-order plane equation of the lane, defined by formula (1) below:

$$Y(X) + A + B \times X + C \times X^2 + D \times X^3 \qquad (1)$$

In formula (1) above, X refers to a specific distance to the front from the vehicle, and Y(X) refers to a distance between the vehicle and the lane at a point of distance X to the front from the vehicle. In addition, A, B, C, and D refer to coefficients of respective orders, output for respective left/right lanes, of the third-order equation. The aiming angle ϕ(X) of the vehicle and lane at a point of distance X to the front from the vehicle can be calculated as defined by formula (2) below:

$$\phi(X) = \frac{dY(X)}{dX} = B + 2C \times X + 3D \times X^2 \qquad (2)$$

Referring to formula (2) above, the aiming angle φ(X) of the vehicle and the lane at a point of distance X to the front from the vehicle can be obtained by differentiating Y(X) of formula (1), which denotes the distance between the lane and the vehicle at a point of distance X to the front from the vehicle, with respect to distance X.

In addition, the curvature ρ(X) of lane at a point of distance X to the front from the vehicle can be obtained by differentiating Y(X) with respect to distance X to the second order, as defined by formula (3) below:

$$\rho(X) = \frac{d^2 Y(X)}{d^2 X} = 2C + 6D \times X \quad (3)$$

In addition, the rate of change of the curvature of lane can be obtained by differentiating Y(X) with respect to distance X to the third order, as defined by formula (4) below:

$$\frac{d\rho(X)}{dX} = \frac{d^2 Y(X)}{d^3 X} = 6D \quad (4)$$

Next, the vehicle sensor provides information regarding the vehicle behavior and driving state as time changes, and the information may include at least one of vehicle longitudinal velocity, vehicle longitudinal acceleration, vehicle yaw rate, steering angle, steering torque, and vehicle transverse acceleration.

The operation determination unit is configured to comprehensively analyze information regarding the lane and vehicle state, which is collected from the camera sensor and the vehicle sensor, and determine whether the steering control device is to intervene for lane keeping. Operation conditions to be considered for the determination include vehicle velocity, road curvature, vehicle longitudinal/transverse acceleration, steering angle and angular velocity, driver torque, direction indicator lamps, and lane recognition states.

In the case of a lane keeping assist device, the controller is activated when lane departure is determined based on comprehensive consideration of vehicle state and lane information, and the controller is deactivated when the vehicle returns inside the lane.

The path generation unit is configured to generate a target path, along which the vehicle is to travel during controller operation. In terms of a function of the lane keeping control device, an optimized target path is generated so that the vehicle can travel on the road actively. In terms of a function of the lane departure prevention device, a target traveling path is generated so that, when the vehicle departures from the lane, it can stably return inside the lane within a predetermined time.

The lane keeping control unit is configured to calculate target steering toque for following the target path calculated by the path generation unit and transmit the target steering toque to the EPS.

The EPS is configured to overlay a steering toque signal, which is received from the lane keeping control system, onto existing driver assist toque and activate the steering device.

Figure 2:
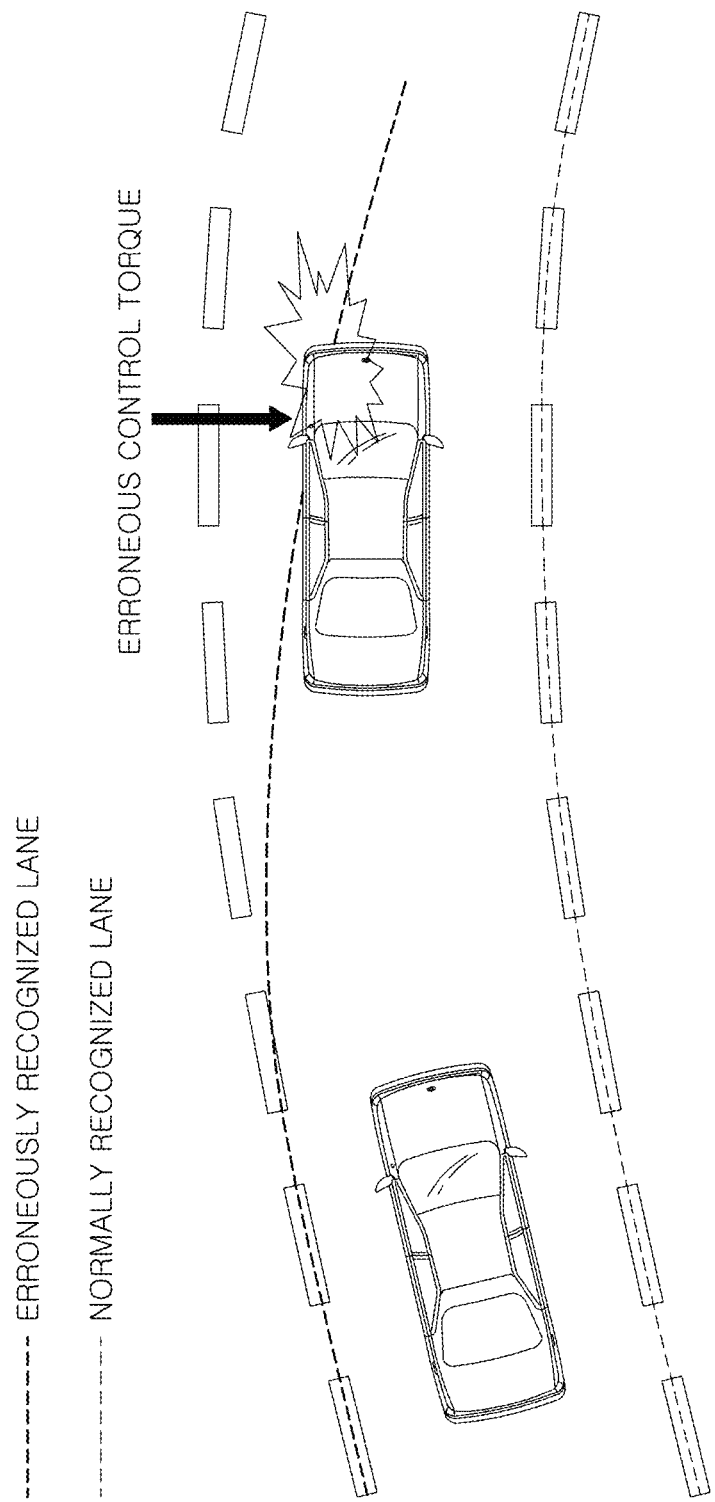
FIG. 2 is a diagram illustrating an erroneous control torque situation according to an embodiment of the present invention.

FIG. 2 is a diagram illustrating an erroneous control torque situation according to an embodiment of the present invention. Referring to FIG. 2, the performance of the lane keeping or following device in such a lane keeping control system as illustrated in FIG. 1 depends on the accuracy of road lane information acquired from the front camera, but the lane recognition performance of the camera can be degraded by various conditions, such as road environments and climate changes.

Such erroneous lane information causes erroneous lane keeping control and makes the safety device lose its function and even cause accidents, and such a possibility is slowing down widespread use of lane keeping devices.

Therefore, the present invention proposes a method for determining whether lane data, which is used for vehicle control, is normal and suppressing the danger of erroneous vehicle control independently when abnormal lane data is introduced, so that the active vehicle safety device fulfills its role.

Figure 3:
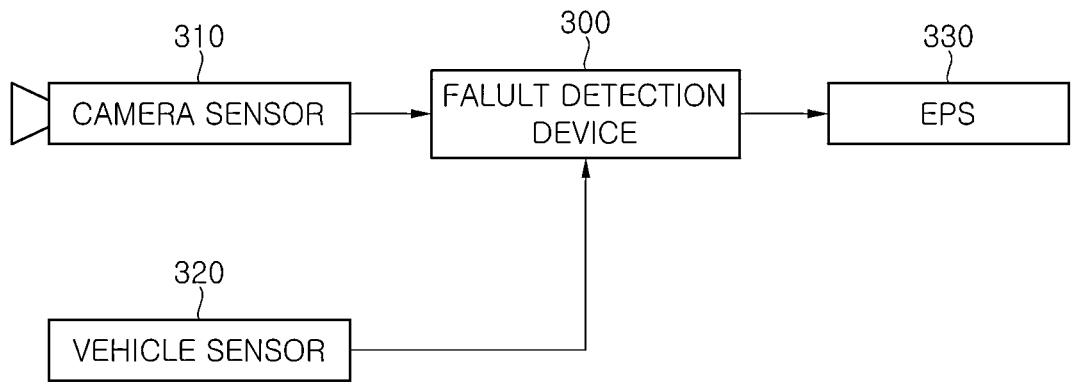
FIG. 3 is a diagram illustrating a lane keeping control system according to an embodiment of the present invention.

FIG. 3 is a diagram illustrating a lane keeping control system according to an embodiment of the present invention. Referring to FIG. 3, the lane keeping control system according to an embodiment of the present invention may include a fault detection device 300, a camera sensor 310, a vehicle sensor 320, and an EPS 330.

The fault detection device 300 is configured to compare information collected from the camera sensor 310 and the vehicle sensor 320 and determine whether lane data acquired from the camera sensor 310 is normal, thereby controlling the EPS 330 effectively.

Figure 4:
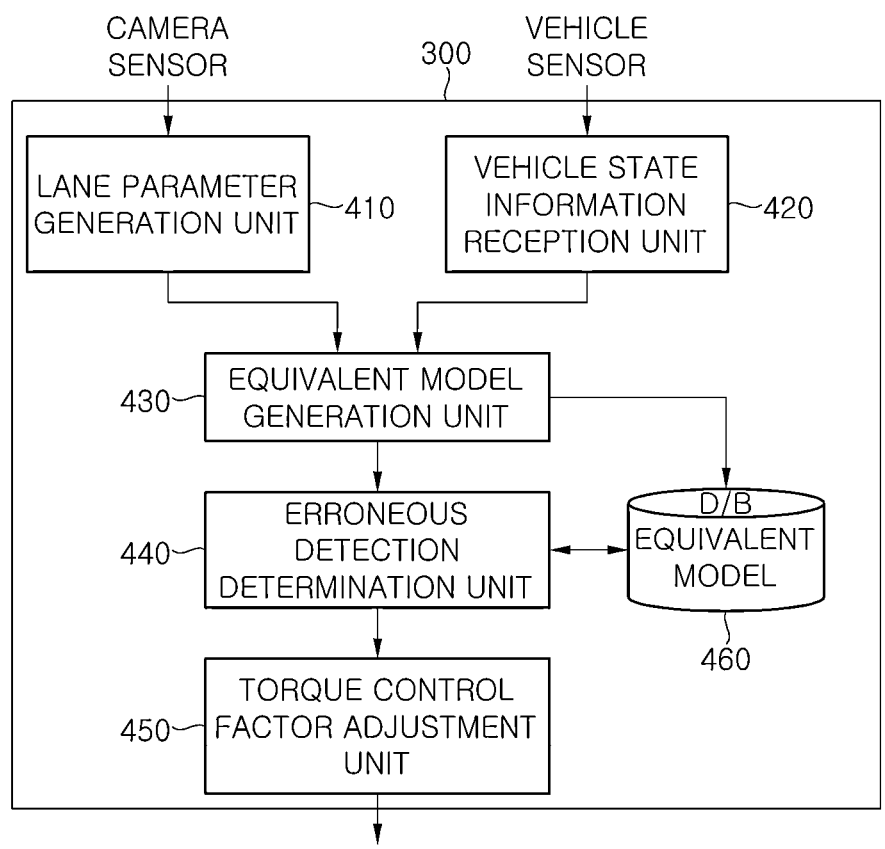
FIG. 4 is a block diagram illustrating a detailed structure of a fault detection device according to an embodiment of the present invention.

FIG. 4 is a block diagram illustrating a detailed structure of the fault detection device according to an embodiment of the present invention. Referring to FIG. 4, the fault detection device 300 according to an embodiment of the present invention may include a lane parameter generation unit 410, a vehicle state information reception unit 420, an equivalent model generation unit 430, an erroneous detection determination unit 440, and a torque control factor adjustment unit 450.

The lane parameter generation unit 410 is configured to output coefficients of the third-order equation, which expresses a relative position with respect to the vehicle on a two-dimensional plane as defined by formula (1) described above, based on information received from the camera sensor.

The vehicle state information reception unit 420 is configured to receive vehicle state information sensed or measured by each sensor or device inside the vehicle. The vehicle state information refers to information regarding the vehicle behavior and driving state as time changes, and may include at least one of vehicle longitudinal velocity, vehicle longitudinal acceleration, vehicle yaw rate, steering angle, steering torque, and vehicle transverse acceleration.

The equivalent model generation unit 430 is configured to receive lane parameters, which are acquired from the camera according to an embodiment of the present invention, from the lane parameter generation unit 410, receive vehicle state information from the vehicle state information reception unit 420, analyze a time flow-related correlation between the vehicle parameters and the vehicle state information according to a method described later, generate an equivalent model of each, and store the equivalent models in an equivalent model database 460.

The erroneous detection determination unit 440 is configured to analyze a case, in which a difference occurs in the equivalent model generated by the equivalent model generation unit 430 as illustrated in FIGS. 7 to 10, simultaneously with respect to a plurality of error items and determine and classify lane parameter erroneous detection situations as illustrated in FIG. 11.

Figure 13:
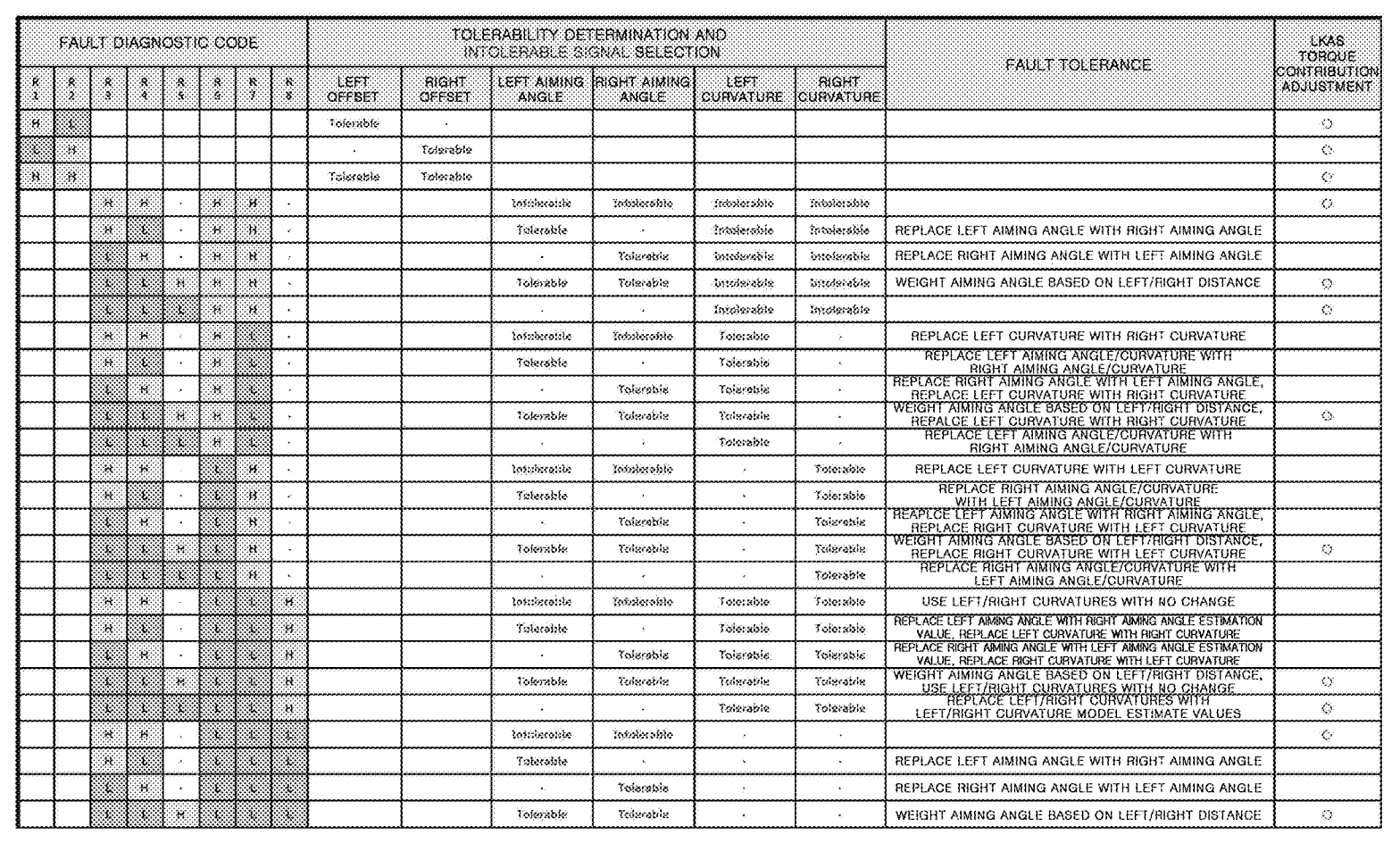

The torque control factor adjustment unit 450 is configured to replace a torque control factor with another signal, isolate it, or adjust it, when the erroneous detection determination unit 440 determines erroneous detection of a lane parameter, according to a preset torque control factor adjustment setup, as illustrated in FIG. 13, so as to suppress or reduce the influence of the erroneous torque.

Meanwhile, respective components of the device are additionally illustrated in the drawings to indicate that they can be separated functionally and logically, and are not to be interpreted as being physically separate components or as being realized as separate codes.

In addition, each functional unit (or module) used herein can refer to a functional/structural combination of hardware for implementing the technical idea of the present invention and software for driving the hardware. It is obvious to those skilled in the art that each functional unit can refer to a specific code and a logical unit of a hardware resource for executing the code, for example, and does not necessarily mean a physically connected code or a single kind of hardware.

FIG. 5 is a flowchart illustrating a fault detection procedure according to an embodiment of the present invention. Referring to FIG. 5, lane parameters are received from the camera sensor (S501). At the same time, various kinds of vehicle state information are received from respective vehicle sensors (S502). The received lane parameters are used to calculate a third-order plane equation of the lane, as described above, and the received vehicle state information is used to express a vehicle movement equation (S503).

Next, the expressed vehicle movement equation is compared with an equivalent function, which is calculated from the third-order plane equation of the lane according to the above-mentioned method, to determine whether erroneous detection has occurred (S504).

Figure 10:
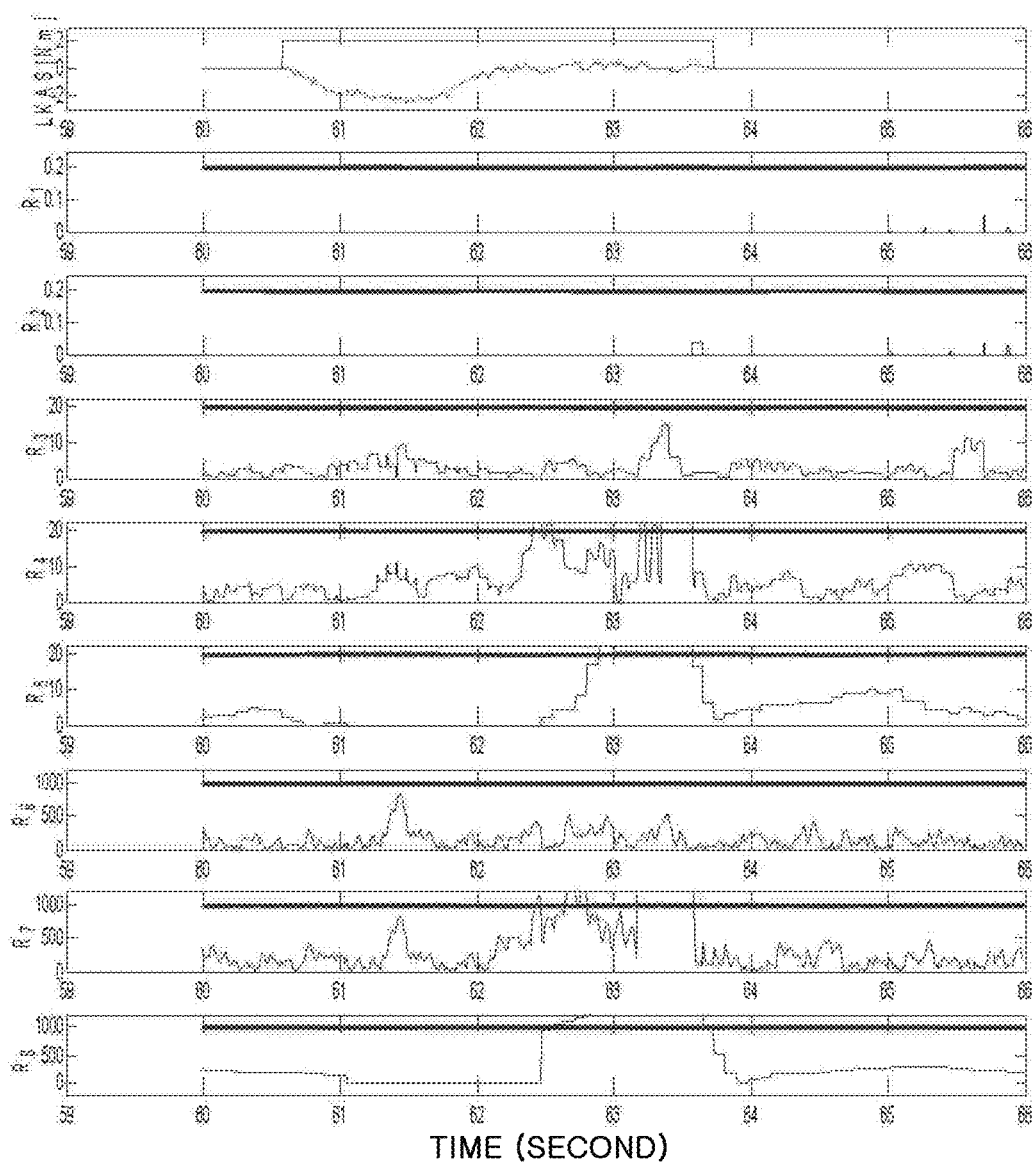
FIG. 10 is a graph illustrating errors of respective items in FIG. 9 according to an embodiment of the present invention.
Figure 12:
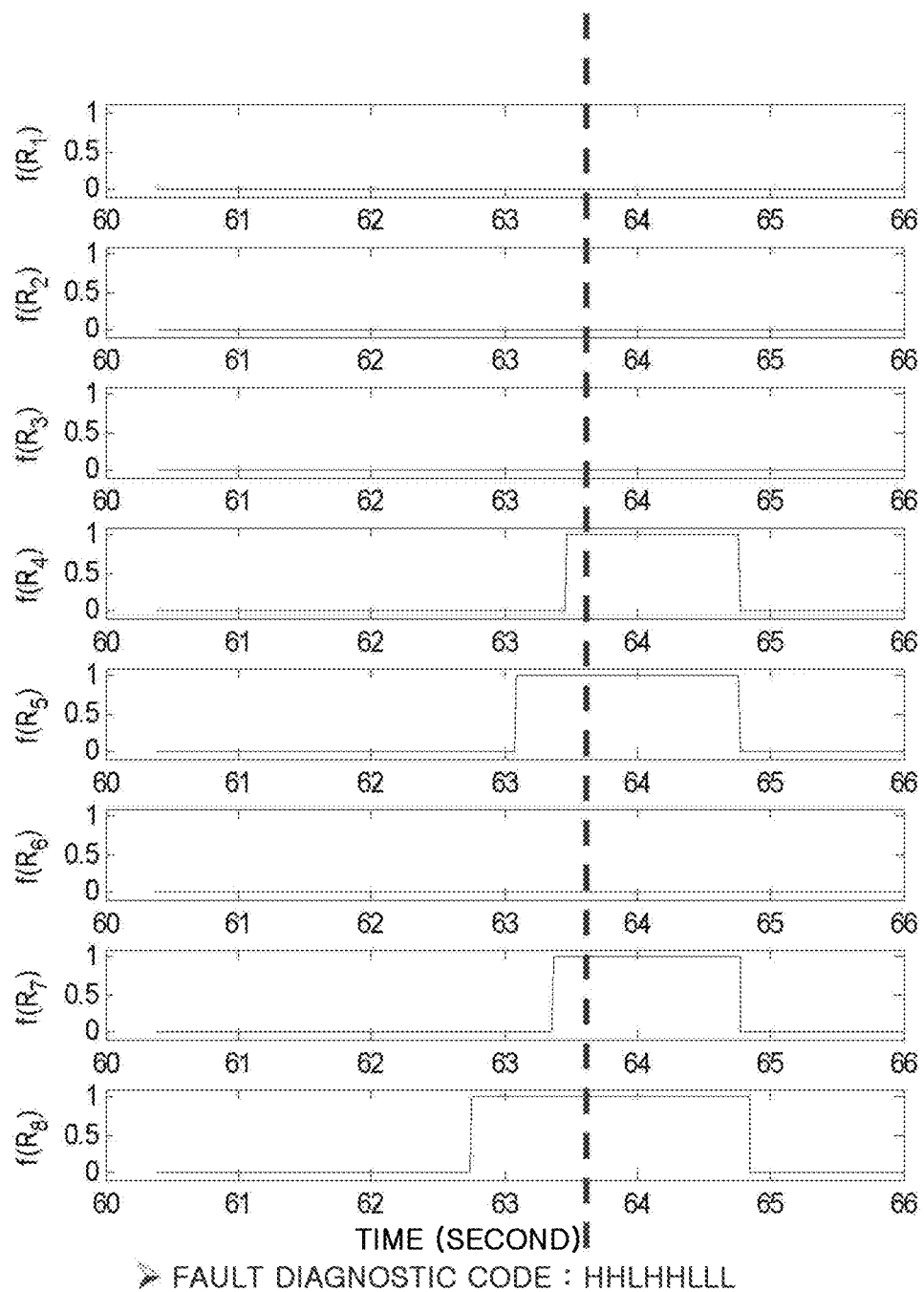
FIG. 12 is a diagram illustrating a fault diagnostic code at a specific point of time according to an embodiment of the present invention.

The determination is made with respect to each fault item as illustrated in FIG. 6 (for example, eight items of R1 to R8); when a difference occurs (S506), as illustrated in FIG. 10, as a result of comparison and exceeds a preset threshold, the corresponding item is checked as faulty (H).

Next, as illustrated in FIG. 11, symptoms corresponding to fault diagnostic codes are confirmed by checking respective items (S507). Finally, as illustrated in FIG. 13, the torque control factor for each corresponding symptom is adjusted (S508) to prevent accidents resulting from erroneous lane data recognition.

Hereinafter, a detailed embodiment of generating an equivalent model by the equivalent model generation unit 430 and determining whether erroneous detection is made for each item by the erroneous detection determination unit 440 will be described in detail with reference to FIGS. 6 to 13.

Meanwhile, the lane keeping system according to the present invention classifies road lane information, which is acquired from the front camera, in the following manner and uses it for lane keeping control.

First, the relative distance of the lane and the vehicle (left: $Y_L(X)$, right: $Y_R(X)$) is used to determine the position of the vehicle inside the lane, and torque is generated in proportion to a distance error with respect to the target path.

Furthermore, the relative aiming angle of the lane and the vehicle (left: $\Phi_L(X)$, right: $\Phi_{LR}X$)) is calculated to determine the aiming angle of the vehicle with respect to the lane, and torque is generated so that the aiming angle approaches zero.

Next, the curvature of the vehicle (left: $\rho_L(X)$, right: $\rho_R(X)$) is calculated to generate toque in proportion to the curvature of the vehicle.

Furthermore, the rate of change of the curvature of the lane (left: $\rho_L(X)/dX$, right: $\rho_R(X)/dX$) is calculated to generate toque in proportion to the rate of change of the curvature of the lane.

Meanwhile, the lane keeping control system according to an embodiment of the present invention compares each classified lane information, before reflecting it, with the relative state of the vehicle in terms of time change and thereby determines whether it is normal.

Therefore, differential equations can be used to convert parameters of the third-order curve equation regarding the lane into time-related functions, concerning the movement of the vehicle, and expressed again as equivalent functions as follows:

First, the longitudinal velocity V of the vehicle is defined by formula (5) below:

$$V = \frac{dX}{dt} \quad (5)$$

In equation (5) above, X refers to a specific distance to the front from the vehicle, as described above.

In this case, the rate of change of distance Y between the left lane and the vehicle in a position of X=0 in terms of time is $Y_L(0)/dt$, and the rate of change of distance Y between the right lane and the vehicle in a position of X=0 in terms of time is $Y_R(0)/dt$.

Meanwhile, the estimated heading angle $\Phi_L(0)$ of the vehicle with respect to the left lane in a position of X=0 is calculated as in formula (6) below:

$$\phi_L(0) = \frac{Y_L(0)}{dt} \times \left(\frac{1}{V}\right) \quad (6)$$

Similarly, the estimated heading angle $\Phi_R(0)$ of the vehicle with respect to the right lane in a position of X=0 is calculated as in formula (7) below:

$$\phi_R(0) = \frac{Y_R(0)}{dt} \times \left(\frac{1}{V}\right) \quad (7)$$

Next, assuming that the rate of change of the heading angle in a position of X=0, measured by the vehicle yaw rate sensor, is $\phi'(v)$, the estimated curvature $\rho_L(0)$ of the left lane in a position of X=0 is given by formula (8) below:

$$\rho_L(0) = \left(\phi'_V + \frac{\phi_L(0)}{dt}\right) \times \frac{1}{V} \quad (8)$$

Similarly, the estimated curvature $\rho_R(0)$ of the right lane in a position of X=0 is given by formula (9) below:

$$\rho_R(0) = \left(\phi'_V + \frac{\phi_R(0)}{dt}\right) \times \frac{1}{V} \quad (9)$$

Meanwhile, the vehicle movement equation is expressed using information received from the vehicle sensors and is compared with an equivalent function, which uses the lane equation obtained from the above formulas. The compared difference is given for each item in a table illustrated in FIG. 6. Referring to FIG. 6, the difference of each parameter can be expressed from R1 to R8.

In FIG. 6, R1 refers to a left lane position and indicates a difference between a left raw lane position value and a lane position estimated by an average lane width.

R2 refers to a right lane position and indicates a difference between a right raw lane position value and a lane position estimated by an average lane width.

R3 refers to a left lane heading angle and indicates a difference between a left lane heading angle estimated by the camera and a left lane heading angle estimated by the vehicle sensor.

R4 refers to a right lane heading angle and indicates a difference between a right lane heading angle estimated by the camera and a right lane heading angle estimated by the vehicle sensor.

R5 refers to a both lane heading angle and indicates a difference between left/right lane heading angles.

R6 refers to a left lane curvature and indicates a difference between a left lane curvature estimated by the camera and a left lane curvature estimated by the vehicle sensor.

R7 refers to a right lane curvature and indicates a difference between a right lane curvature estimated by the camera and a right lane curvature estimated by the vehicle sensor.

R8 refers to a both lane curvature and indicates a difference between left/right lane curvatures.

As such, it is possible to determine whether erroneous detection of lane data is made by comparing an equivalent model calculated from lane parameters for each item and an equivalent model estimated from values measured from the vehicle sensor.

Figure 7:
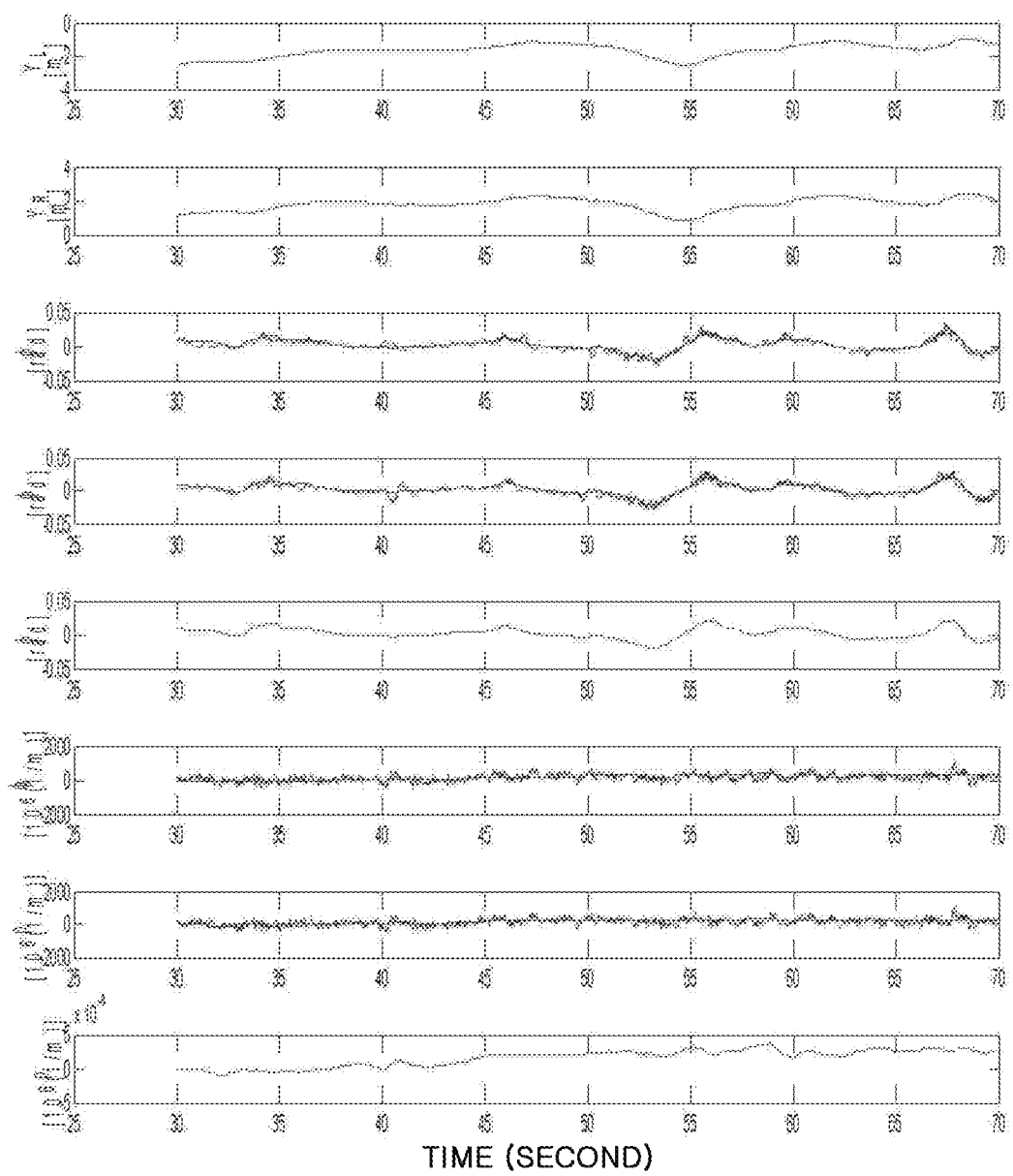
FIG. 7 is a graph illustrating a result of normally detecting an actual lane according to an embodiment of the present invention.

FIG. 7 is a graph illustrating a result of normally detecting an actual lane according to an embodiment of the present invention.

Referring to FIG. 7, the device according to an embodiment of the present invention simultaneously inspects the amount of change from R1 to R8, which is calculated as illustrated in FIG. 6, in real time with respect to a plurality of items.

That is, the device inspects signals of R1 to R8 of FIG. 6 simultaneously and detects a moment at which each amount of change exceeds a preset threshold.

Figure 8:
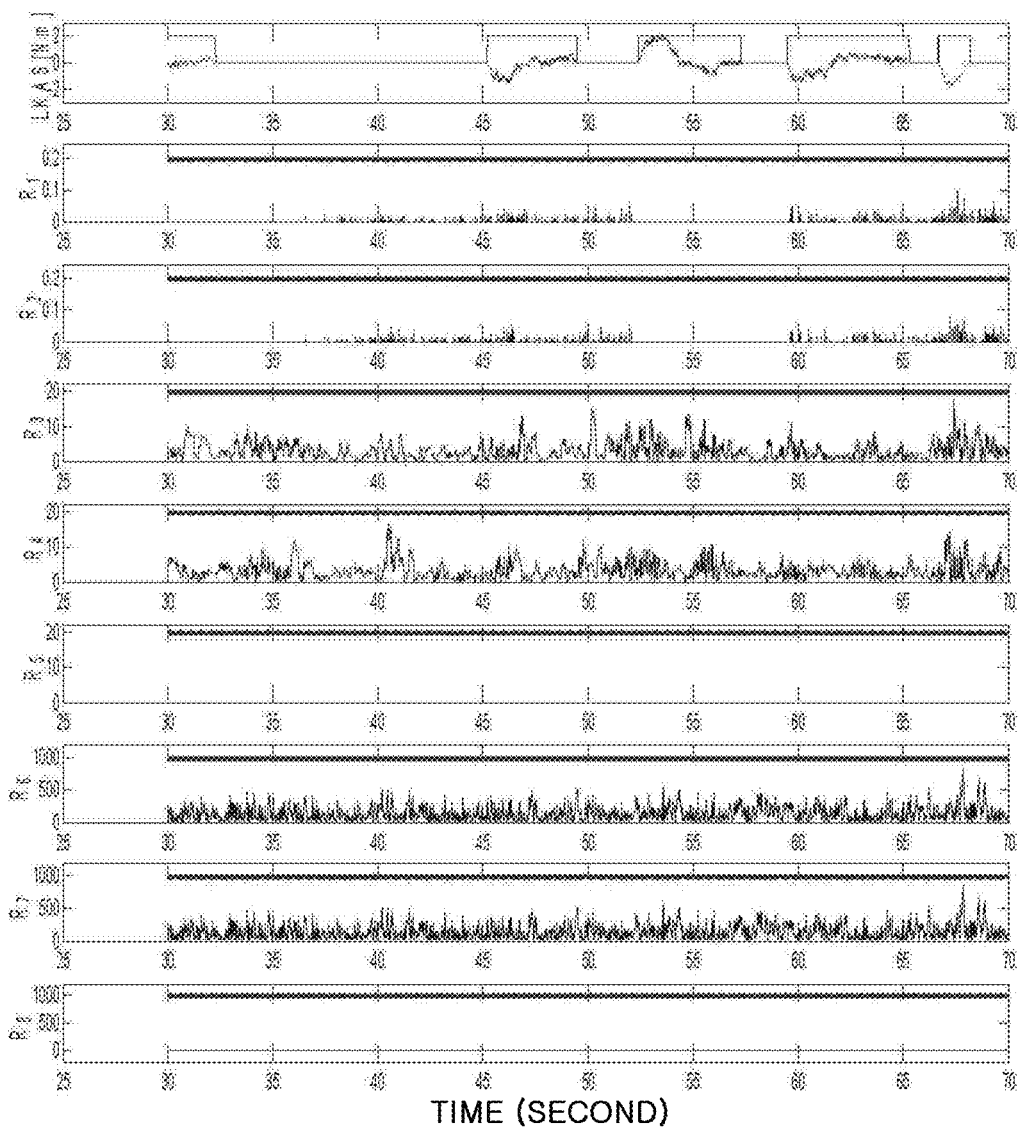
FIG. 8 is a graph illustrating errors of respective items in FIG. 7 according to an embodiment of the present invention.

FIG. 7 illustrates a result of normally detecting an actual lane, and it is clear from FIG. 8 that the differences of R1 to R8 do not exceed preset thresholds. This means that lane data is recognized normally.

Figure 9:
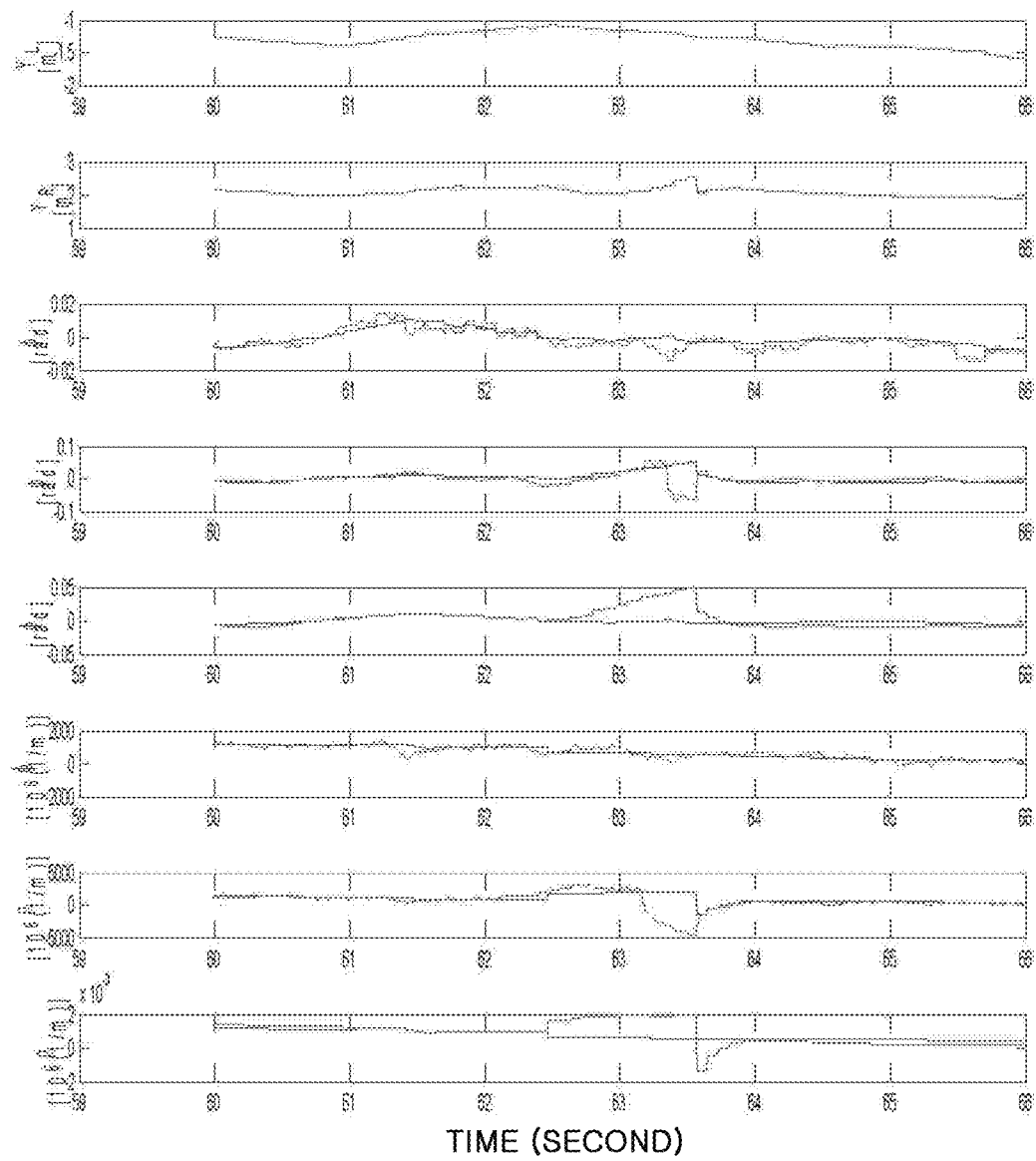
FIG. 9 is a graph illustrating a state of erroneously recognizing a lane, different from the actual lane, according to an embodiment of the present invention.

On the other hand, FIG. 9 illustrates a state of erroneously recognizing a lane, different from an actual lane, and it is clear from FIG. 10 that differences of some signals of R1 to R8 exceed preset thresholds.

Therefore, the device according to the present invention simultaneously inspects the change of R1 to R8 confirmed in FIG. 10 and, when a specific change persists for a preset period of time, detects and classifies an erroneous recognition situation as illustrated in the table of FIG. 11.

Accordingly, a fault diagnostic code F(a) can be generated like f(R8 )f(R7)f(R6)f(R5)f(R4)f(R3)f(R2)f(R1). Each item of the generated fault diagnostic code can be expressed as H (faulty) or L (normal) according as a fault determination.

For example, when the fault diagnostic code is expressed in the order of R8 to R1 as "HHLHHLLL" in FIG. 11, the diagnosis is that the right lane heading angle and curvature information is abnormal. That is, referring to FIG. 12, each item of the fault diagnostic code is in the above-mentioned state between $63^{th}$ and $64^{th}$ seconds.

FIG. 13 is a diagram illustrating measures for respective fault diagnostic codes according to an embodiment of the present invention. Referring to FIG. 13, it is determined that, in the case of a symptom illustrated in FIG. 11, the right aiming angle and the right curvature are tolerable, so that the right aiming angle replaces the left aiming angle, and the right curvature replaces the left curvature.

Figure 14:
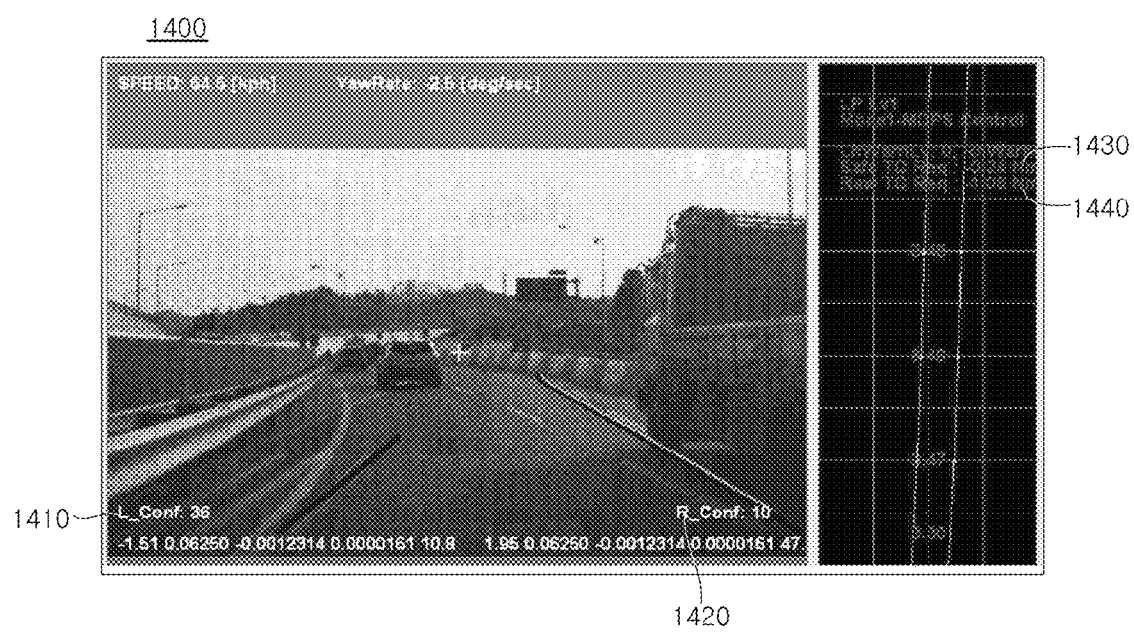
FIG. 14 is a diagram illustrating a scene of control torque processing by control torque contribution ratio reduction when erroneous recognition has occurred according to an embodiment of the present invention.

FIG. 14 is a diagram illustrating a scene of control torque processing by control torque contribution ratio reduction when erroneous recognition occurs according to an embodiment of the present invention. Referring to FIG. 14, according to an embodiment of the present invention, control torque can be processed by reducing the control torque contribution ratio when erroneous recognition occurs. In FIG. 14, reference numeral 1410 refers to a left control torque contribution ratio (%); reference numeral 1420 refers to a right control torque contribution ratio (%); reference numeral 1440 refers to an erroneous operation torque value; and reference numeral 1430 refers to a safe torque value controlled according to the present invention.

Figure 15:
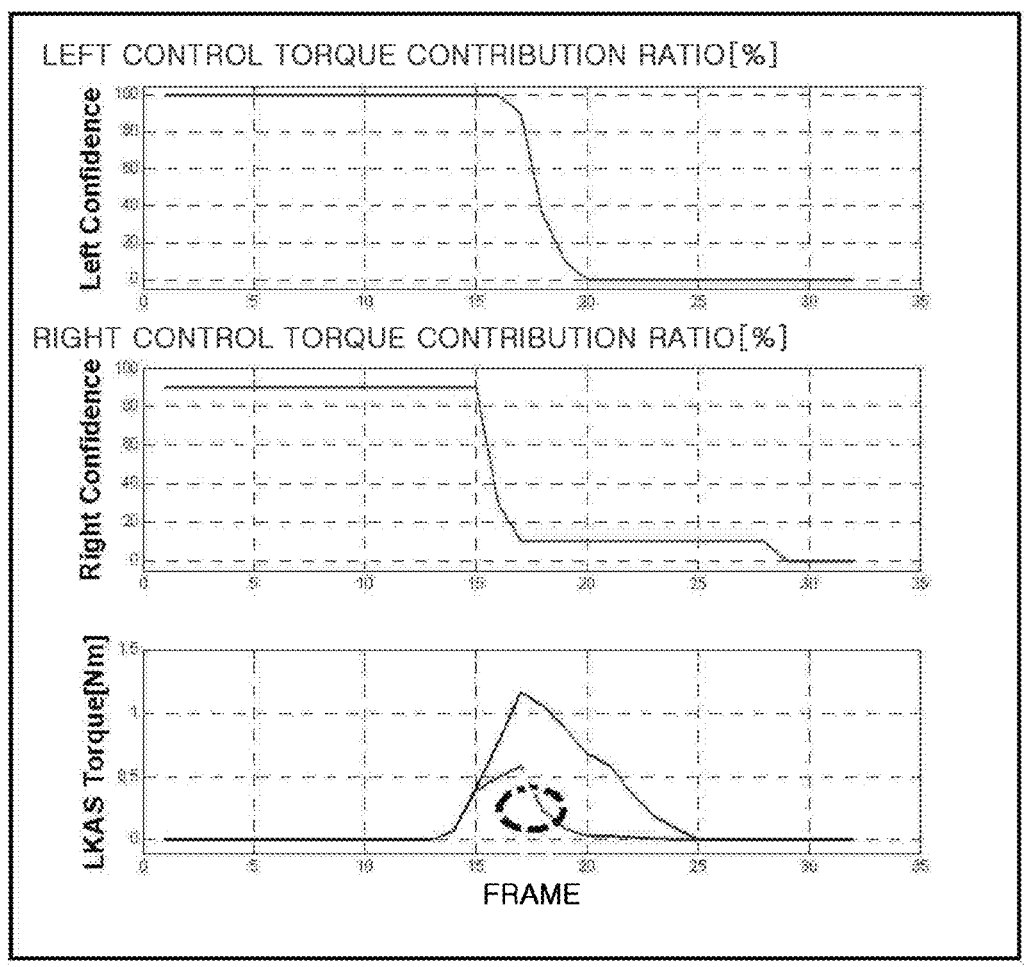
FIG. 15 is a diagram illustrating left/right control torque contribution ratios according to an embodiment of the present invention.

FIG. 15 illustrates left/right control torque contribution ratios according to an embodiment of the present invention, and it is clear that torque is processed safely according to an embodiment of the present invention at the corresponding frame where the left and right control torque contribution ratios are changed.

As described above, the present invention is advantageous in that determination of whether lane data, which has been acquired for vehicle control, is normal can prevent the danger of erroneous vehicle control that could occur when the lane is recognized erroneously based on data sensed by the camera sensor.

In addition, the present invention can be applied to any system, which can cause a danger when erroneous recognition by a sensor occurs, to sense occurrence of erroneous recognition effectively.

Although the present invention has been described above with reference to specific features, such as concrete components, limited embodiments, and drawings, this is solely for the purpose of aiding general understanding of the present invention; the present invention is not limited to the above embodiments, and those skilled in the art can make various changes and modifications from the disclosure.

Therefore, the idea of the present invention is not to be limited to the described embodiments, and not only the following claims but any equivalent or equivalent change thereof fall within the scope of the present invention.

DESCRIPTION OF REFERENCE NUMERALS

300: fault detection device
310: camera sensor
320: vehicle sensor
330: EPS
410: lane parameter generation unit
420: vehicle state information reception unit
430: equivalent model generation unit
440: erroneous detection determination unit
450: torque control factor adjustment unit
460: equivalent model database

What is claimed is:
1. A lane keeping control system, comprising:
a fault detection device including:
a lane parameter generation unit that generates a relative position between a lane and a vehicle as a lane parameter, based on information received from a camera installed on the vehicle;

a vehicle state information reception unit that receives vehicle state information sensed or measured by each vehicle sensor or device installed on the vehicle;

an equivalent model generation unit that
receives the lane parameter from the lane parameter generation unit,
receives the vehicle state information from the vehicle state information reception unit,
analyzes a time flow-related correlation between the vehicle parameter and the vehicle state information, and
generates an equivalent model based on the analyzed time flow-related correlation;

an erroneous detection determination unit that determines and classifies an erroneous detection of a lane parameter by simultaneously analyzing a case, in which a difference occurs from the equivalent model generated by the equivalent model generation unit, for each of at least one error; and a torque control factor adjustment unit that adjusts a torque control factor according to a preset torque control factor adjustment setup so as to suppress or reduce the influence of erroneous torque when the erroneous detection determination unit determines the erroneous detection.

2. The lane keeping control system according to claim 1, wherein the lane parameter generation unit generates lane parameters, wherein the lane parameters include coefficients of a third-order equation expressing a relative position between the lane and the vehicle on a two-dimensional plane.

3. The lane keeping control system according to claim 1, wherein the vehicle state information received by the vehicle state information reception unit comprises at least one selected from vehicle longitudinal velocity, vehicle longitudinal acceleration, vehicle yaw rate, steering angle, steering toque, and vehicle transverse acceleration.

4. The lane keeping control system according to claim 1, wherein the equivalent model generation unit generates an equivalent model by calculating the time flow-related correlation between the vehicle parameter and the vehicle state information as an equivalent function from the received lane parameter and the vehicle state information.

5. The lane keeping control system according to claim 1, wherein the erroneous detection determination unit to determines the erroneous detection when a difference value in the equivalent model generated by the equivalent model generation unit exceeds a preset threshold.

6. The lane keeping control system according to claim 5, wherein the erroneous detection determination unit determines the erroneous detection when a difference value in the equivalent model generated by the equivalent model generation unit exceeds a preset threshold for a preset period of time.

7. The lane keeping control system according to claim 1, wherein the error comprises at least one selected from a left lane position error, a right lane position error, a left lane heading angle error, a right lane heading angle error, a both lane heading angle error, a left lane curvature error, a right lane curvature error, and a both lane curvature error.

8. The lane keeping control system according to claim 1, wherein the preset torque control factor adjustment setup by the torque control factor adjustment unit comprises at least one selected from replacement of at least one torque control factor with a different signal, isolation of at least one torque control factor, and adjustment of at least one torque control factor.

9. A vehicle control system comprising:
a vehicle camera that is installed on a vehicle and that collects lane data;
at least one vehicle sensor that is installed on the vehicle and that senses at least one piece of vehicle state information;
a fault detection device that
generates a lane parameter from lane data collected from the vehicle camera,
receives the vehicle state information from the vehicle sensor,
analyzes a time flow-related correlation between the vehicle parameter and the vehicle state information,
generates an equivalent model based on the analyzed time flow-related correlation, and
determines whether an erroneous detection of the lane data is occurred; and
an electronic power steering (EPS) that receives a steering torque signal from the fault detection device according to a situation of erroneous detection of a lane parameter for each error of the fault detection device, reflects the steering torque signal on assist torque regarding a driver of the vehicle, and thereby controls a steering device.

10. The vehicle control system according to claim 9, wherein the fault detection device comprises:
a lane parameter generation unit that generates a relative position between a lane and a vehicle as a lane parameter based on information received from a camera installed on the vehicle;
a vehicle state information reception unit that receives vehicle state information sensed or measured by each vehicle sensor or device installed on the vehicle;
an equivalent model generation unit that
receives the lane parameter from the lane parameter generation unit,
receives the vehicle state information from the vehicle state information reception unit,
analyzes a time flow-related correlation between the vehicle parameter and the vehicle state information, and
generates an equivalent model;
an erroneous detection determination unit that determines and classifies an erroneous detection of a lane parameter by simultaneously analyzing a case, in which a difference occurs from the equivalent model generated by the equivalent model generation unit, for each of at least one error; and
a torque control factor adjustment unit that adjusts a torque control factor according to a preset torque control factor adjustment setup so as to suppress or reduce the influence of erroneous torque when the erroneous detection determination unit determines the erroneous detection.

11. A method for lane data fault detection for lane keeping assist, the method performed by a fault detection device including a lane parameter generation unit, a vehicle state information reception unit, an equivalent model generation unit, an erroneous detection determination unit, and a torque control factor adjustment unit, the method comprising:
generating, by the lane parameter generation unit, a relative position between a lane and a vehicle as a lane parameter based on information received from a camera installed on the vehicle;
receiving, by the vehicle state information reception unit, vehicle state information sensed or measured by each vehicle sensor or device installed on the vehicle;

analyzing, by the equivalent model generation unit, a time flow-related correlation between the received vehicle parameter and the vehicle state information and generating an equivalent model based on the analyzed time flow-related correlation;

determining and classifying, by the erroneous detection determination unit, a situation of erroneous detection of a lane parameter by simultaneously analyzing a case, in which a difference occurs in the generated equivalent model for each of at least one error; and adjusting, by the torque control factor adjustment unit, a torque control factor according to a preset torque control factor adjustment setup so as to suppress or reduce the influence of erroneous torque when the erroneous detection is determined as a result of the determining.

12. The method according to claim 11, wherein, in the generating a relative position, lane parameters are generated, wherein the lane parameters include coefficients of a third-order equation expressing a relative position between a lane and a vehicle on a two-dimensional plane.

13. The method according to claim 11, wherein the received vehicle state information comprises at least one selected from vehicle longitudinal velocity, vehicle longitudinal acceleration, vehicle yaw rate, steering angle, steering toque, and vehicle transverse acceleration.

14. The method according to claim 11, wherein, in the analyzing, an equivalent model is generated by calculating the time flow-related correlation between the vehicle parameter and the vehicle state information as an equivalent function from the received lane parameter and the vehicle state information.

15. The method according to claim 11, wherein, in the determining and classifying, the erroneous detection is determined when a difference value in the generated equivalent model exceeds a preset threshold.

16. The method according to claim 15, wherein, in the determining and classifying, the erroneous detection is determined when a difference value in the generated equivalent model exceeds a preset threshold for a preset period of time.

17. The method according to claim 11, wherein the error comprises at least one selected from a left lane position error, a right lane position error, a left lane heading angle error, a right lane heading angle error, a both lane heading angle error, a left lane curvature error, a right lane curvature, and a both lane curvature error.

18. The method according to claim 11, wherein the preset torque control factor adjustment setup comprises at least one selected from replacement of at least one torque control factor with a different signal, isolation of at least one torque control factor, and adjustment of at least one torque control factor.

19. A vehicle control method, performed by a vehicle control system including a vehicle camera, at least one vehicle sensor, a fault detection device, and an electronic power steering (EPS), the method comprising:

collecting, by the vehicle camera, lane data from a vehicle camera installed on a vehicle;

sensing, by the at least one vehicle sensor, at least one piece of vehicle state information from at least one vehicle sensor installed on the vehicle;

generating, by the fault detection device, a lane parameter from the lane data collected from the vehicle camera;

receiving, by the fault detection device, the vehicle state information from the vehicle sensor, analyzing a time flow-related correlation between the vehicle parameter and the vehicle state information, and generating an equivalent model based on the analyzed time flow-related correlation;

determining, by the fault detection device, whether an erroneous detection of the lane data is occurred based on the generated equivalent model; and generating, the fault detection device, a steering torque signal according to a situation of erroneous detection of a lane parameter for each error based on the determining whether the erroneous detection is occurred and providing the EPS with the generated steering torque signal.

20. A non-transitory computer-readable recording medium on which a program for executing a method according to claim 11 is recorded.

* * * * *